US008118497B2

(12) United States Patent
Yi

(10) Patent No.: US 8,118,497 B2
(45) Date of Patent: Feb. 21, 2012

(54) CONNECTOR UTILIZED FOR DIFFERENT KINDS OF SIGNAL TRANSMITION

(75) Inventor: Chong Yi, Mechanicsburg, PA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 548 days.

(21) Appl. No.: 12/317,652

(22) Filed: Dec. 23, 2008

(65) Prior Publication Data

US 2010/0158449 A1 Jun. 24, 2010

(51) Int. Cl.
*G02B 6/36* (2006.01)
(52) U.S. Cl. .............................. 385/93; 385/88; 385/92
(58) Field of Classification Search ................ 385/93, 385/88, 92
See application file for complete search history.

(56) References Cited

U.S. PATENT DOCUMENTS

| | | | | |
|---|---|---|---|---|
| 5,419,717 A * | 5/1995 | Abendschein et al. | ........ | 439/577 |
| 6,543,941 B1 * | 4/2003 | Lampert | ........................... | 385/58 |
| 6,592,401 B1 | 7/2003 | Gardner et al. | | |
| 7,021,971 B2 * | 4/2006 | Chou et al. | .................... | 439/660 |
| 7,104,848 B1 * | 9/2006 | Chou et al. | .................... | 439/660 |
| 7,160,032 B2 * | 1/2007 | Nagashima et al. | ........... | 385/75 |
| 7,248,470 B2 * | 7/2007 | Chen et al. | ............... | 361/679.41 |
| 7,380,991 B2 | 6/2008 | Schempp | | |
| 7,429,137 B2 * | 9/2008 | Sontag et al. | ................... | 385/75 |
| 7,572,071 B1 * | 8/2009 | Wu | ................................ | 385/94 |
| 7,581,892 B2 * | 9/2009 | Daikuhara | ...................... | 385/92 |
| 7,588,445 B2 * | 9/2009 | He et al. | .......................... | 439/79 |
| 7,815,469 B1 * | 10/2010 | Nguyen et al. | ........... | 439/607.35 |
| 7,896,559 B2 * | 3/2011 | Yi et al. | ........................... | 385/75 |
| 2002/0110336 A1 * | 8/2002 | Dair et al. | ....................... | 385/92 |
| 2003/0152331 A1 * | 8/2003 | Dair et al. | ....................... | 385/59 |
| 2008/0013895 A1 * | 1/2008 | Daikuhara | ...................... | 385/88 |
| 2011/0003514 A1 * | 1/2011 | Nguyen et al. | ................ | 439/660 |

* cited by examiner

*Primary Examiner* — Rhonda Peace
(74) *Attorney, Agent, or Firm* — Wei Te Chung; Andrew C. Cheng; Ming Chieh Chang

(57) ABSTRACT

A connector (100) includes a metallic shell (5) having a mating frame part, said mating frame part including a number of sides together enclosing a hollow portion, and the hollow portion divided into two ports with different shapes; an insulative housing (1) having a base portion (11) and two juxtaposed tongue portions (12, 13) extending forwardly from the base portion, with a plurality of contacts (21, 22) mounted to the tongue portions, two lens members (4) received in lateral sides of one of the tongue portions; and the two tongue portions respectively received in the two ports.

19 Claims, 11 Drawing Sheets

CONNECTOR UTILIZED FOR DIFFERENT KINDS OF SIGNAL TRANSMITION

CROSS-REFERENCE TO RELATED APPLICATIONS

This application is related to U.S. patent application Ser. No. 11/818,100, filed on Jun. 13, 2007 and entitled "EXTENSION TO UNIVERSAL SERIAL BUS CONNECTOR WITH IMPROVED CONTACT ARRANGEMENT", and U.S. patent application Ser. No. 11/982,660, filed on Nov. 2, 2007 and entitled "EXTENSION TO ELECTRICAL CONNECTOR WITH IMPROVED CONTACT ARRANGEMENT AND METHOD OF ASSEMBLING THE SAME", both of which have the same assignee as the present invention.

BACKGROUND OF THE INVENTION

1. Field of the Invention

The present invention relates to a connector, more particularly to a connector which is capable of transmitting an electrical signal and an optical signal.

2. Description of Related Art

Recently, personal computers (PC) are used of a variety of techniques for providing input and output. Universal Serial Bus (USB) is a serial bus standard to the PC architecture with a focus on computer telephony interface, consumer and productivity applications. The design of USB is standardized by the USB Implementers Forum (USB-IF), an industry standard body incorporating leading companies from the computer and electronic industries. USB can connect peripherals such as mouse devices, keyboards, PDAs, gamepads and joysticks, scanners, digital cameras, printers, external storage, networking components, etc. For many devices such as scanners and digital cameras, USB has become the standard connection method.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed; 3) A Hi-Speed rate of up to 480 Mbit/s (60 MB/s). Though Hi-Speed devices are advertised as "up to 480 Mbit/s", not all USB 2.0 devices are Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transfer rates of the non-USB protocols discussed above are highly desirable for certain applications. However, these non-USB protocols are not used as broadly as USB protocols. Many portable devices are equipped with USB connectors other than these non-USB connectors. One important reason is that these non-USB connectors contain a greater number of signal pins than an existing USB connector and are physically larger as well. For example, while the PCI Express is useful for its higher possible data rates, a 26-pin connectors and wider card-like form factor limit the use of Express Cards. For another example, SATA uses two connectors, one 7-pin connector for signals and another 15-pin connector for power. Due to its clumsiness, SATA is more useful for internal storage expansion than for external peripherals.

The existing USB connectors have a small size but low transmission rate, while other non-USB connectors (PCI Express, SATA, et al) have a high transmission rate but large size. Neither of them is desirable to implement modern high-speed, miniaturized electronic devices and peripherals. To provide a kind of connector with a small size and a high transmission rate for portability and high data transmitting efficiency is much desirable.

In recent years, more and more electronic devices are adopted for optical transmitter. It may be good idea to design a connector which is capable of transmitting an electrical signal and an optical signal. Someone has begun to conceive such kind of connector which is compatible of electrical and optical signals transmitting. The connector includes metallic contacts assembled to an insulated housing and several optical lenses bundled together and mounted to the housing too. A kind of hybrid cable includes wires and fiber are respectively attached to the metallic contacts and the optical lenses.

However, the aforementioned connector is troublesome in assembling and manufacturing.

BRIEF SUMMARY OF THE INVENTION

Accordingly, an object of the present invention is to provide an easily manufactured connector which is capable of transmitting an electrical signal and an optical signal.

In order to achieve the above-mentioned object, a connector in accordance with present invention comprises a metallic shell having a mating frame part, said mating frame part including a number of sides together enclosing a hollow portion, and the hollow portion divided into two ports with different shapes; an insulative housing having a base portion and two juxtaposed tongue portions extending forwardly from the base portion, with a plurality of contacts mounted to the tongue portions, two lens members received in lateral sides of one of the tongue portions; and the two tongue portions respectively received in the two ports.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
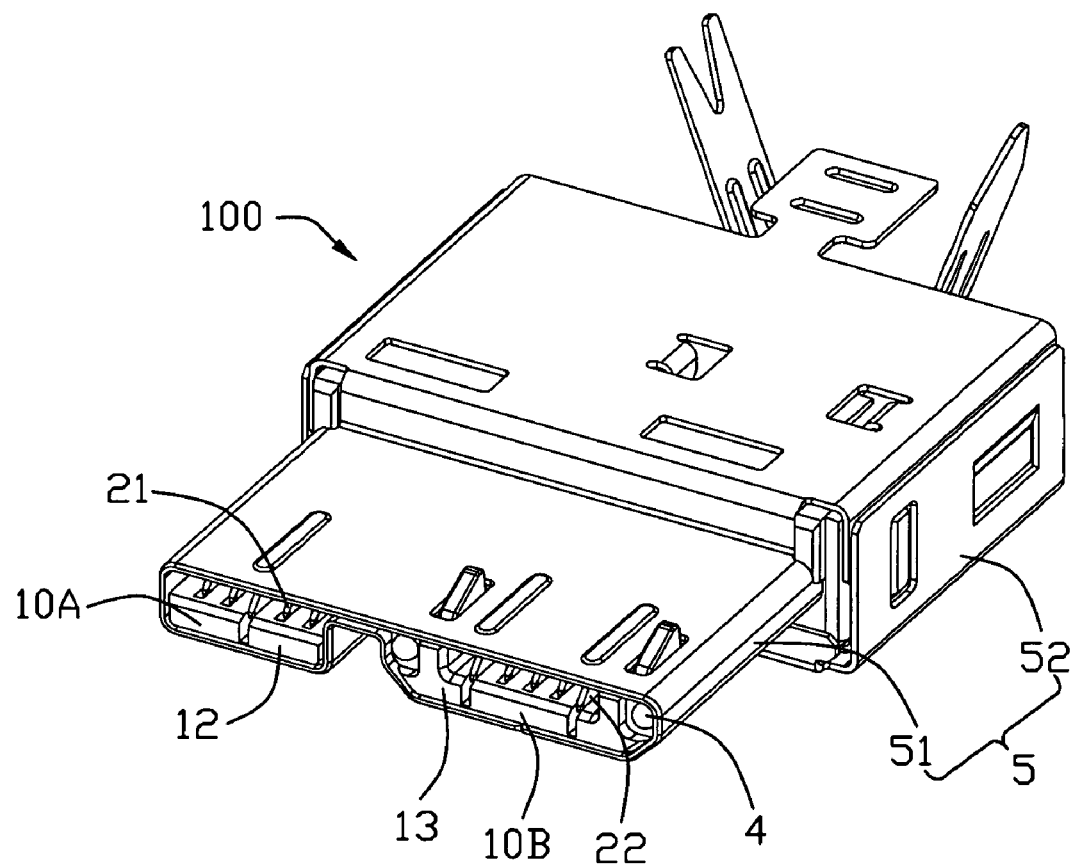
FIG. 1 is an assembled, perspective view of a plug connector.
Figure 2:
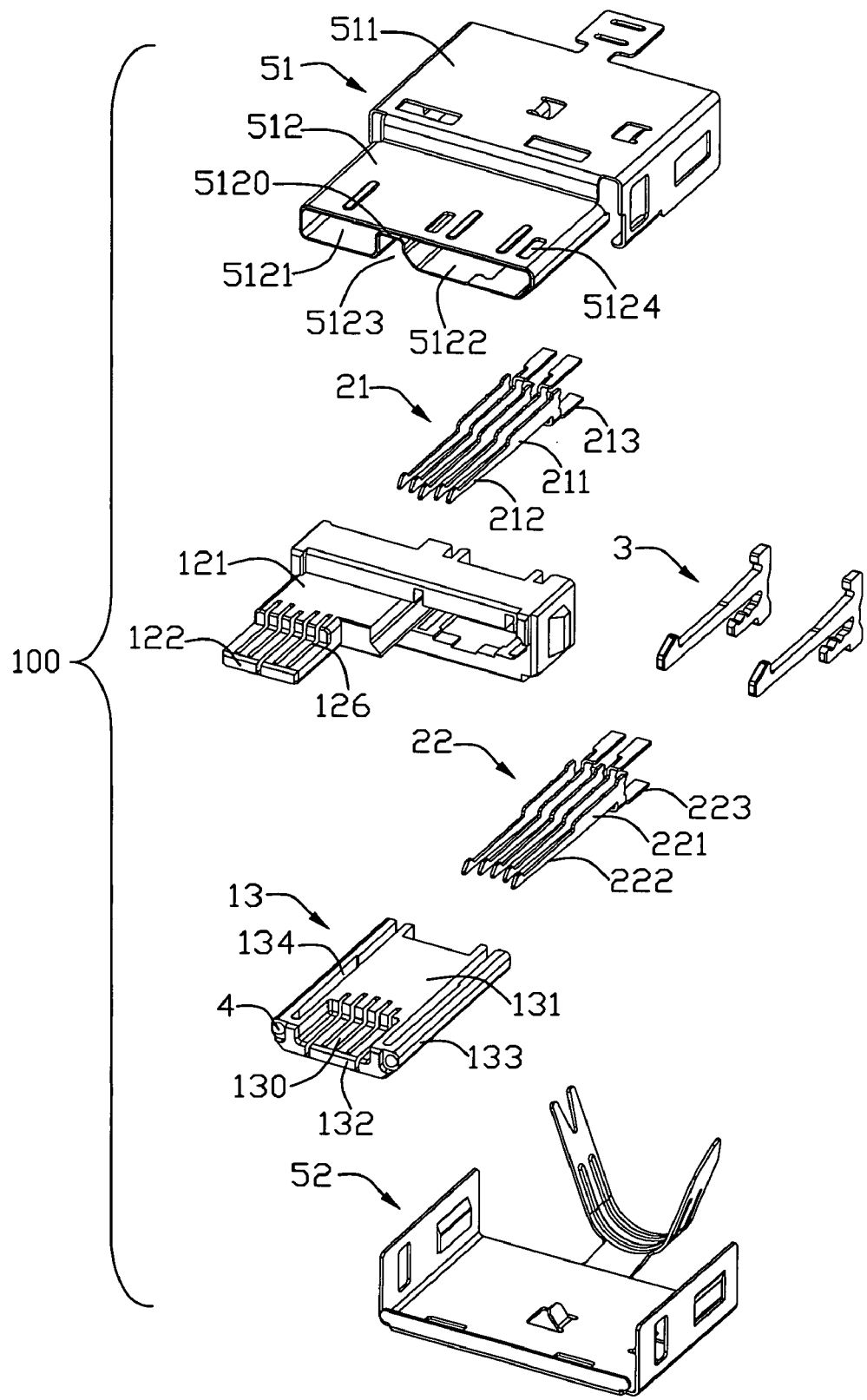
FIG. 2 is an exploded, perspective view of the plug connector.
Figure 3:
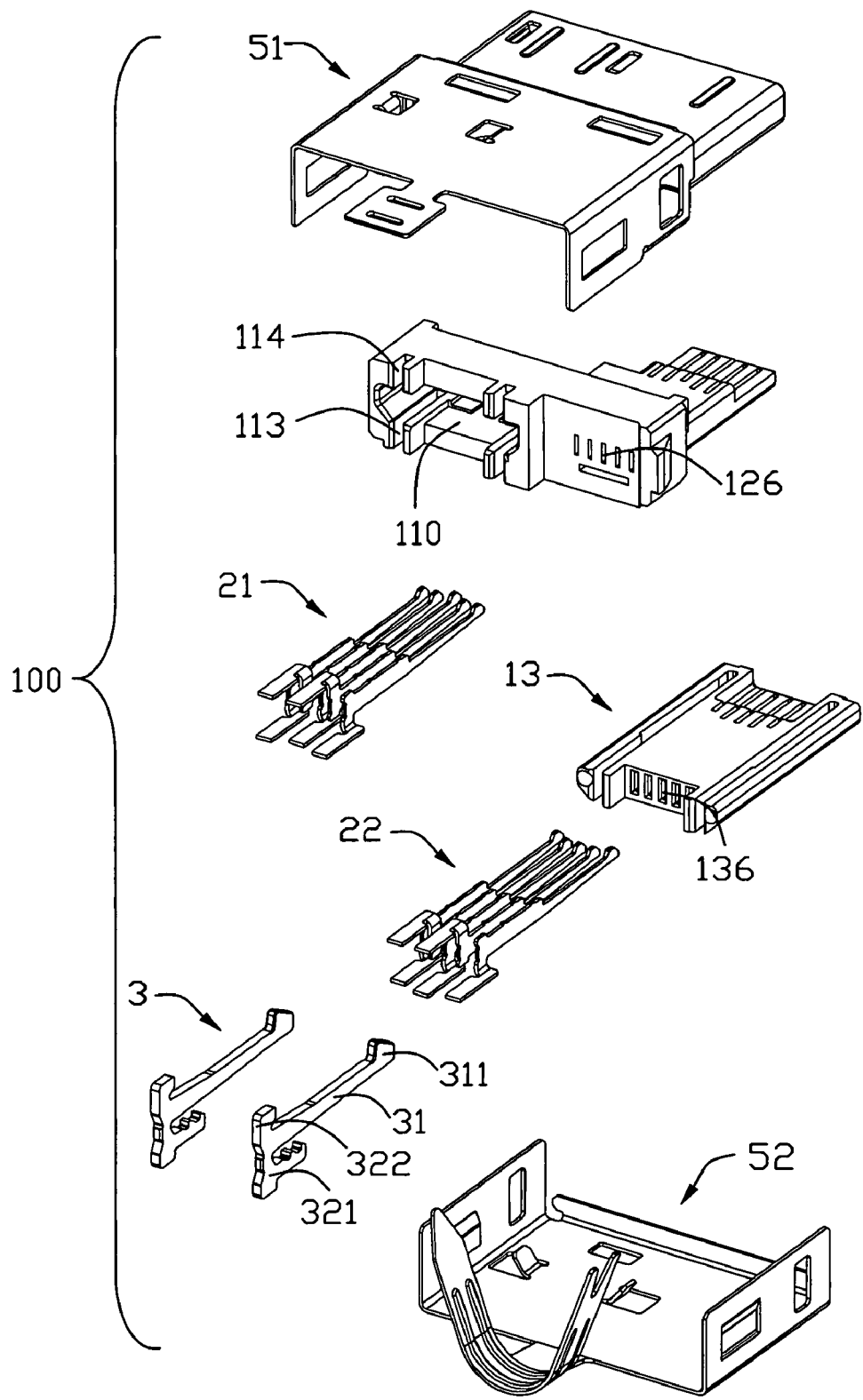
FIG. 3 is a view similar to FIG. 2, but viewed from a different aspect.
Figure 4:
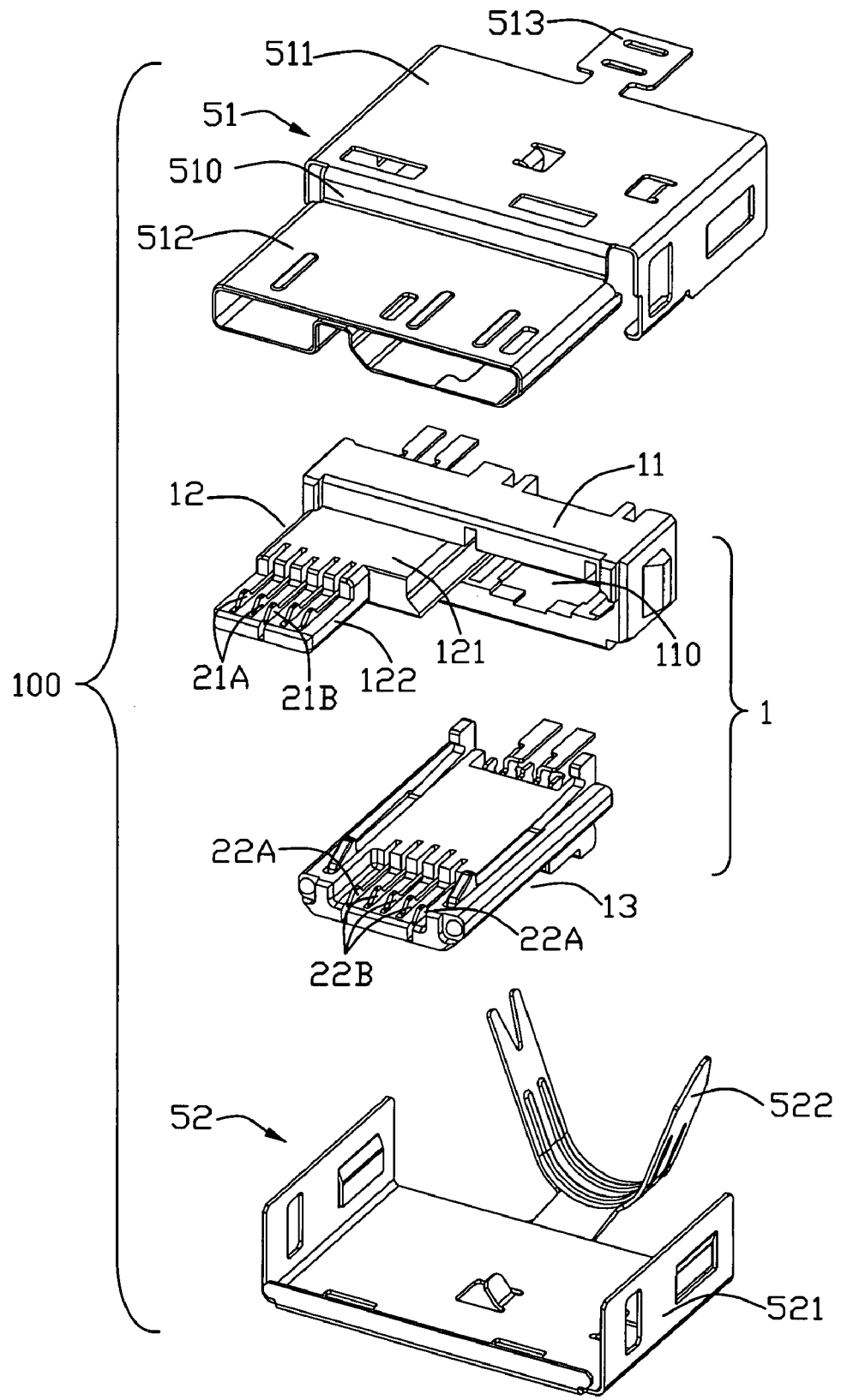
FIG. 4 is a partially assembled view of the plug connector.
Figure 5:
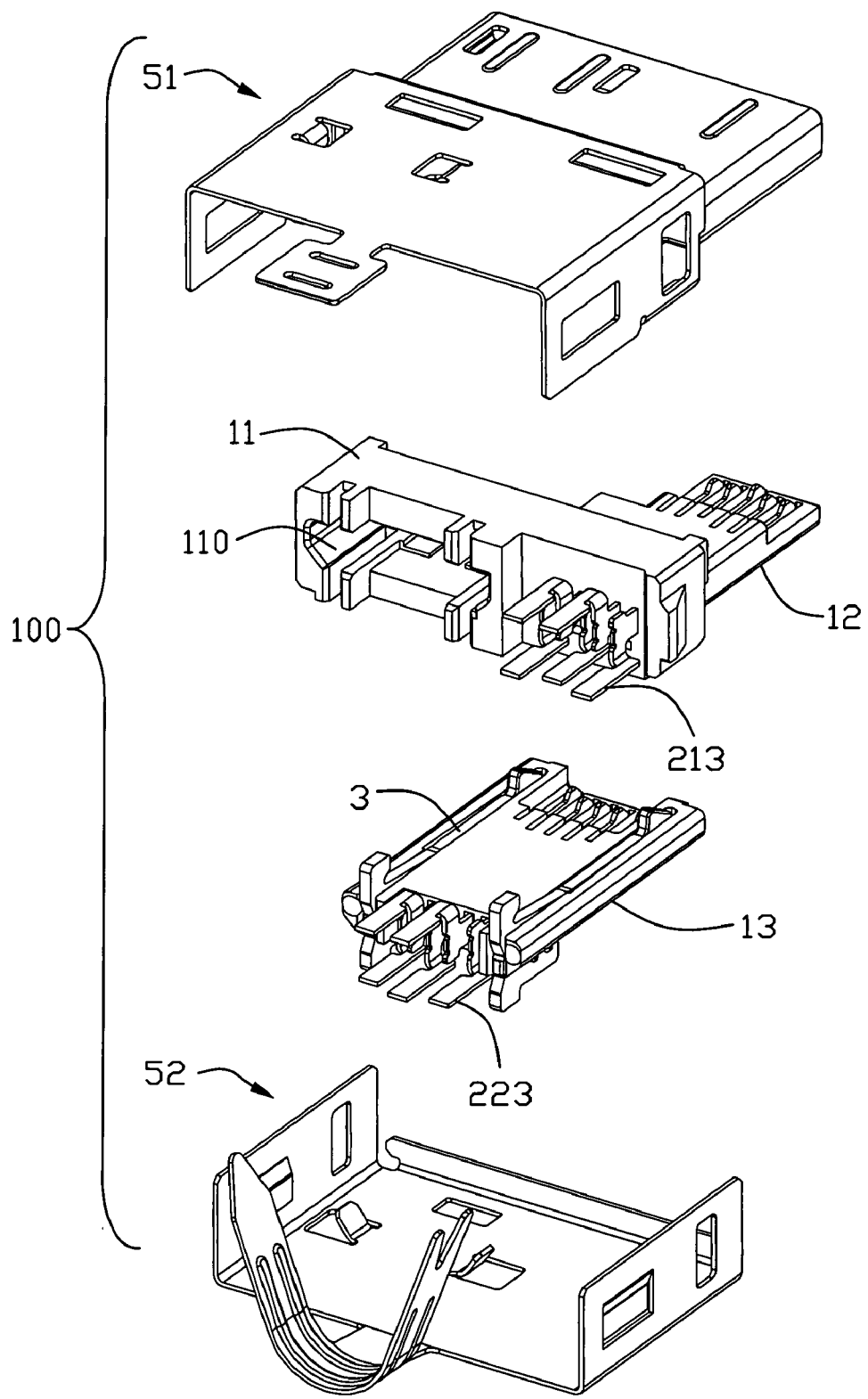
FIG. 5 is a view similar to FIG. 4, but viewed from a different aspect.
Figure 6:
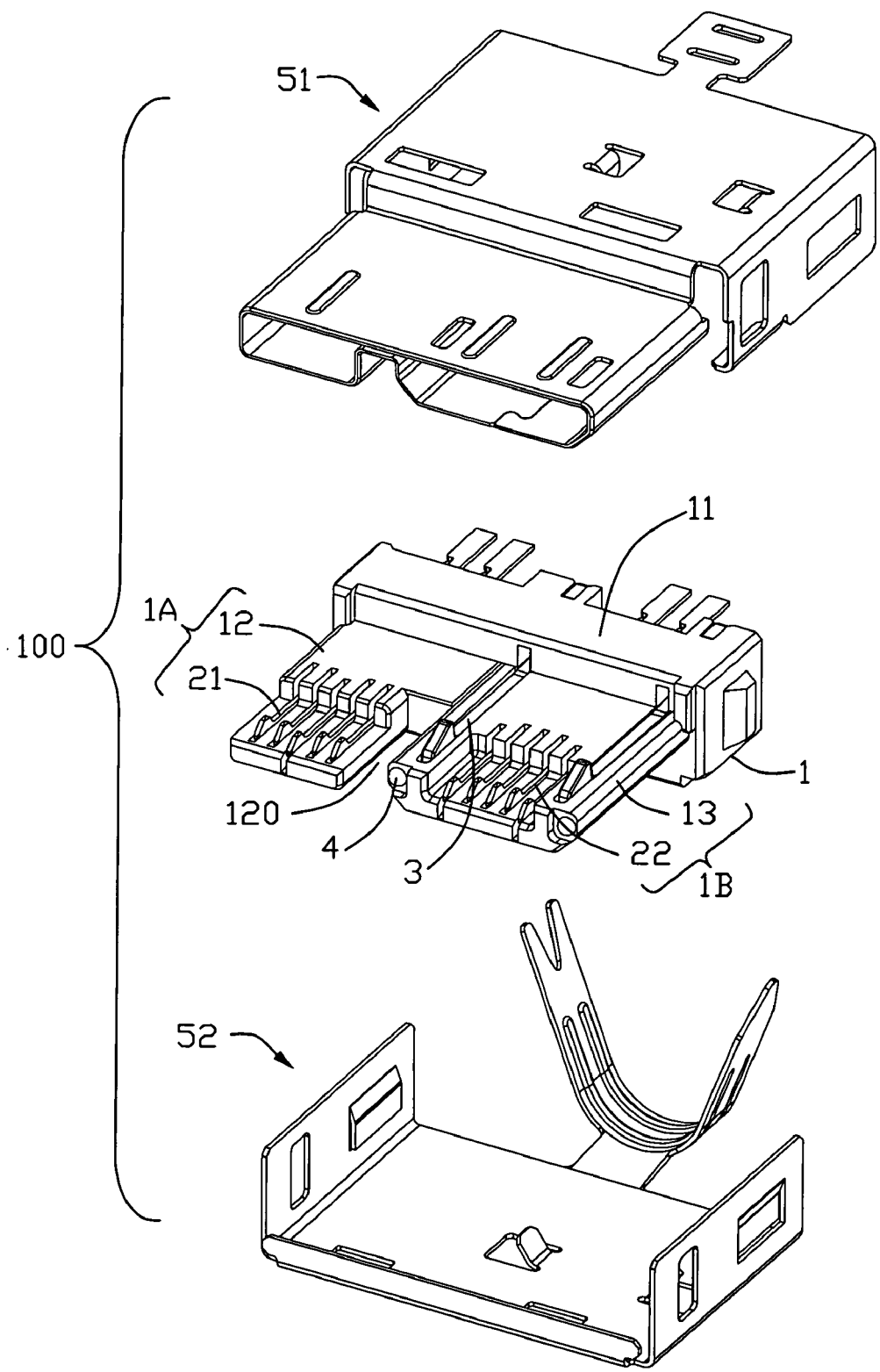
FIG. 6 is other partially assembled, perspective view of the plug connector.
Figure 7:
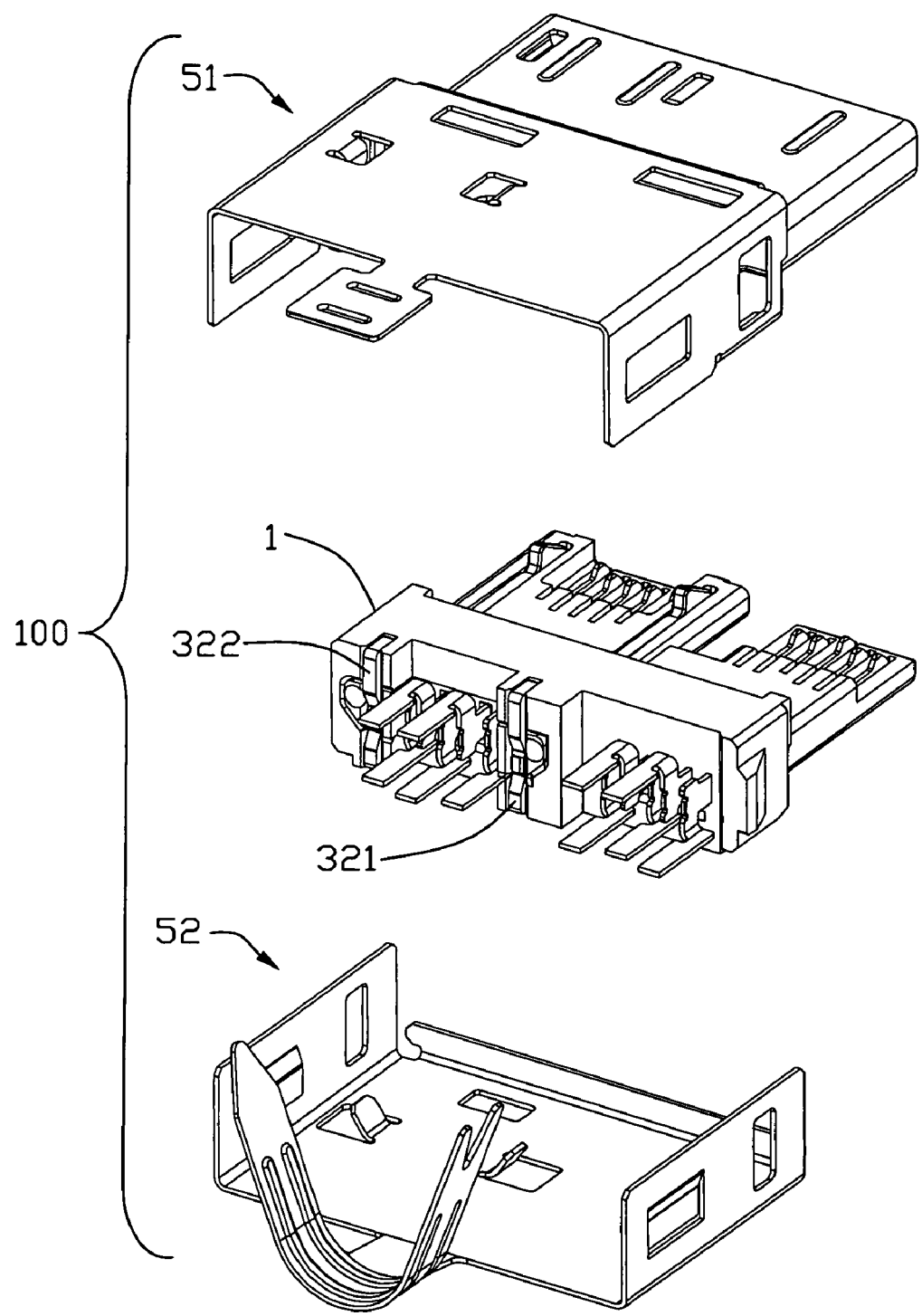
FIG. 7 is a view similar to FIG. 6, but viewed from a different aspect.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-7, a plug connector 100 according to a first embodiment of the present invention comprises an insulative housing 1, a plurality of contacts 21, 22 supported by the insulative housing 1, a pair of latch members 3, two lens members 4 mounted to the insulated housing 1, and a metallic shell 5 enclosing the insulative housing 1. Detail description of these elements and their relationship and other elements formed thereon will be detailed below.

The insulative housing 1 includes a base portion 11, a first tongue portion 12 and a second tongue portion 13 arranged in juxtaposed manner and extending forwardly from the base portion 11. A gap 120 is located between the first tongue portion 12 and the second tongue portion 13. The first tongue portion 12 includes a base part 121 connected to a front side of the base portion 11 and a mating part 122 extending forwardly from a lower segment of a front surface of the base part 121. Thus, the first tongue portion 12 is of L-shaped viewed from either a top side or lateral side (see FIG. 2). A number of contact slots 126 are recessed forwardly from a back surface of the base portion 11 and extends beyond the front surface of the base part 121. The second tongue portion 13 comprises a base part 131 and a mating part 132 extending forwardly from a lower segment of a front surface of the base part 131. Two attachment beams 133 are respectively formed at lateral sides of the base part 131 and the mating part 132. Therefore, a depression portion 130 is formed in the front segment of the second tongue portion 13. A pair of grooves 134 are recessed downwardly from top surfaces of the attachment beams 133, respectively. The base portion 11 further defines a cavity 110 for receiving a rear segment of the second tongue portion 13.

The contacts includes a set of first contacts 21 and a set of second contacts 22 divided into distinct rows along a transversal direction.

The first contacts 211 includes five contact members and are separated into two differential pairs 21A and a grounding contact 21B located between the two differential pairs 21A. Each first contact 21 includes a retention portion 211 received in the contact slots 126, a contacting portion 212 extending forwardly from the retention portion 211 and supported by the mating part 122, and a tail portion 213 extending rearward from the retention portion 211 and beyond the back surface of the base portion 11. The tail portions 213 of the second and fourth positions of the row of the first terminals 21 are spaced apart the tail portions 213 of the rest of the first terminals 21 along a vertical direction, and such configuration facilitates soldering process. The first tongue portion 12 associated with the first contacts 21 thereon are defined as a first mating portion 1A.

The second contacts 22 includes five contact members which have substantially identical shape and disposition as those of the of the first contacts 21. Two of the second contacts 22 arranged at lateral sides of the second contacts row is power contacts 22A and the rest of the second contacts 22 are signal contacts 22B. Each second contact 22 includes a retention portion 221 received in a corresponding contact slot 136 of the base part 131, a contacting portion 222 extending forwardly from the retention portion 221, accommodated in the depression portion 130 and supported by the mating part 132, and a tail portion 223 extending rearward from the retention portion 221 and beyond the back surface of the base part 131. The tail portions 223 of the second and fourth positions of the row of the second terminals 22 are spaced apart the tail portions 223 of the other second terminals 22 along a vertical direction, and such configuration facilitates soldering process.

The latch member 3 includes a latch arm portion 31 extending along a horizontal direction, a T-shaped first retention portion 321 connected to a bottom surface of an rear end of the latch arm portion 31, an inverted L-shaped second retention portion 322 projects upwardly from a top surface of the rear end the latch arm portion 31. A hook part 311 is formed at a free end of the latch arm portion 31. The latch member 31 is assembled to the corresponding attachment beam 133, with the latch arm portion 31 accommodated in the corresponding groove 134, and the second tongue portion 13 is mounted to the cavity 110, with the first and second retention portions 321, 322 respectively inserted into a first positioning slot 113 and the second positioning slot 114 defined in a rear section of the base portion 11. The two lens members 4 are respectively mounted to the attachment beams 133. The second tongue portion 13 together with the second contacts 21 and lens members 4 thereon is defined as a second mating portion 1B.

The metallic shell 5 includes a first shell part 51 and a second shell part 52. The first shell part 51 includes an inverted U-shaped body part 511, a mating frame part 512 located in front of the body part 511 and connected to the body part 511 via a vertical neck part 510, and a tail part 513 extending rearward from middle section of a back edge of an up side of the body part 511. The mating frame part 512 includes a plurality of sides (not numbered) together enclosing a hollow portion. A ridge segment 5120 projects into an interior of the mating frame part 512 from the bottom side thereof, and the mating frame part 512 is divided into a first and second ports 5121, 5122 with different shapes. And a channel 5123 is formed under the ridge segment 5120. The first port 5121 is rectangular shaped and the second port 5122 is hexagon shaped viewed from a front side. The first mating portion 1A is accommodated in the first port 5121 to form a first mating port 10A, and the second mating portion 1B is accommodated in the second port 5122 to from a second mating port 10B. The base portion 11 is accommodated in the inverted U-shaped body part 512, with a front surface thereof abutting against the neck part 510. The hook parts 311 project outside through apertures 5124 in a top side (not numbered) of the mating frame part 512. The second shell part 52 includes a U-shaped body part 521 assembled to the inverted U-shaped body part 512 and a V-shaped holder member 522 is adapted for crimped to a cable (not shown). The first shell part 51 and the second shell part 52 are securely engaged with the insulative housing 1.

Figure 8:
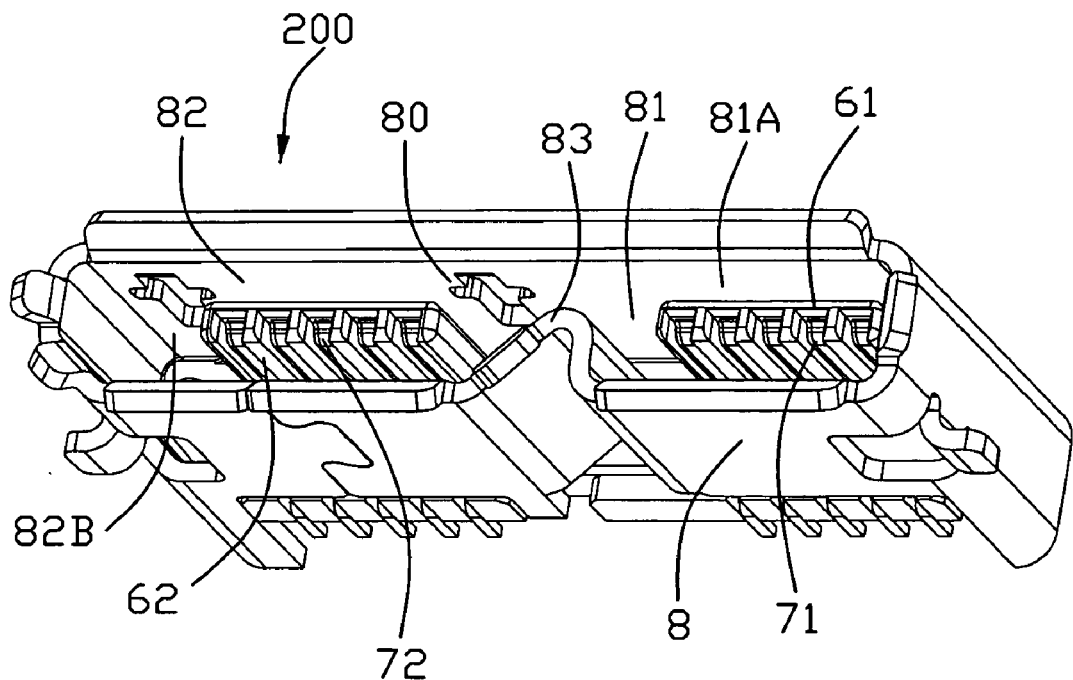
FIG. 8 is an assembled, perspective view of a receptacle connector.
Figure 9:
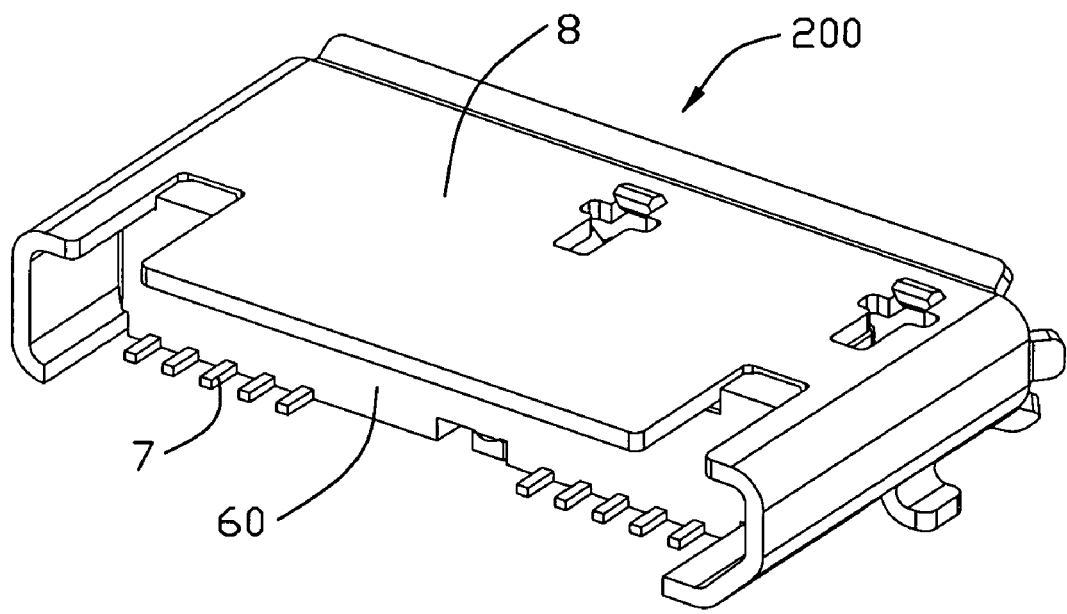
FIG. 9 is a view similar to FIG. 8, but viewed from a different aspect.

Referring to FIGS. 8-9, a receptacle connector 200 according to a preferred embodiment of the present invention is disclosed. The receptacle connector 200 comprises an insulated housing, a plurality of terminals 7 mounted to the insulated housing and a metallic shell 8 shielding the insulated housing.

The insulated housing including a base portion 60, a first tongue portion 61 and a second tongue portion 62 arranged in juxtaposed manner and extending forwardly from the base portion 60. Five first terminals 71 supported by the first tongue portion 61 together form a first mating segment, and five second terminals 72 supported by the second tongue portion 62 together form a second mating segment. The metallic shell 8 has a plurality of walls (not numbered) corporately enclosing a receiving space 80 therebetween. A protrusion portion 83 extends into the receiving space 80 from the bottom wall of the metallic shell 8 to divide the receiving space 80 into a rectangular shaped first port 81 and a hexagon shaped second port 82. The first mating segment and the second mating segment respectively extend into the first port 81 and the second port 82 to form a first mating port 81A and the second mating port 82B. The receptacle connector 200 further includes two coupling lens members (not shown) mounted to the base portion 60 and arranged at lateral sides of the second tongue portion 62. The first terminals 71 and second terminals 72 have substantially same structure and detailed description is omitted.

When the plug connector 100 mates with the receptacle connector 200, the first mating port 10A and the second mating port 10B are respectively plugged into first mating port 81A and the second mating port 82B of the receptacle connector 200, with the first contacts 21 and the second contacts 22 mating with the first terminals 71 and the second terminals 72, the lens members 4 mating with the coupling lens members of the receptacle connector 200. Furthermore, the protrusion portion 83 slides along the channel 5123, which can ensure the plug connector 100 mating with receptacle connector 200 more accurately.

Figure 10:
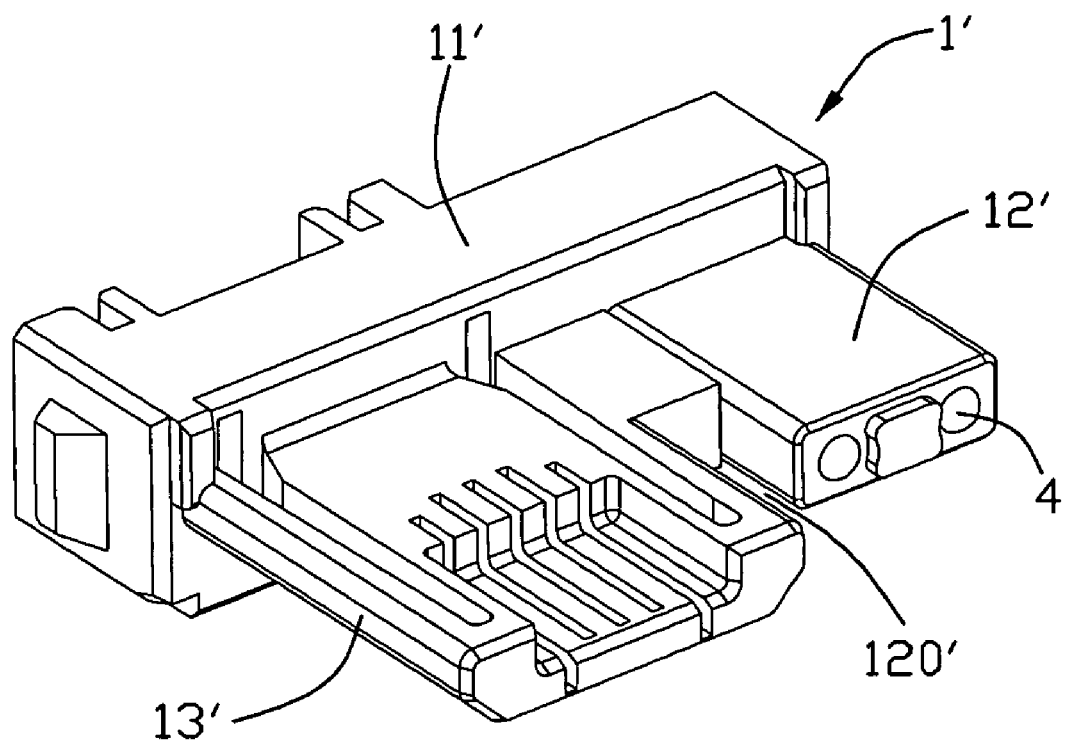
FIG. 10 shows an insulative housing of a plug connector of another embodiment of the present invention.
Figure 11:
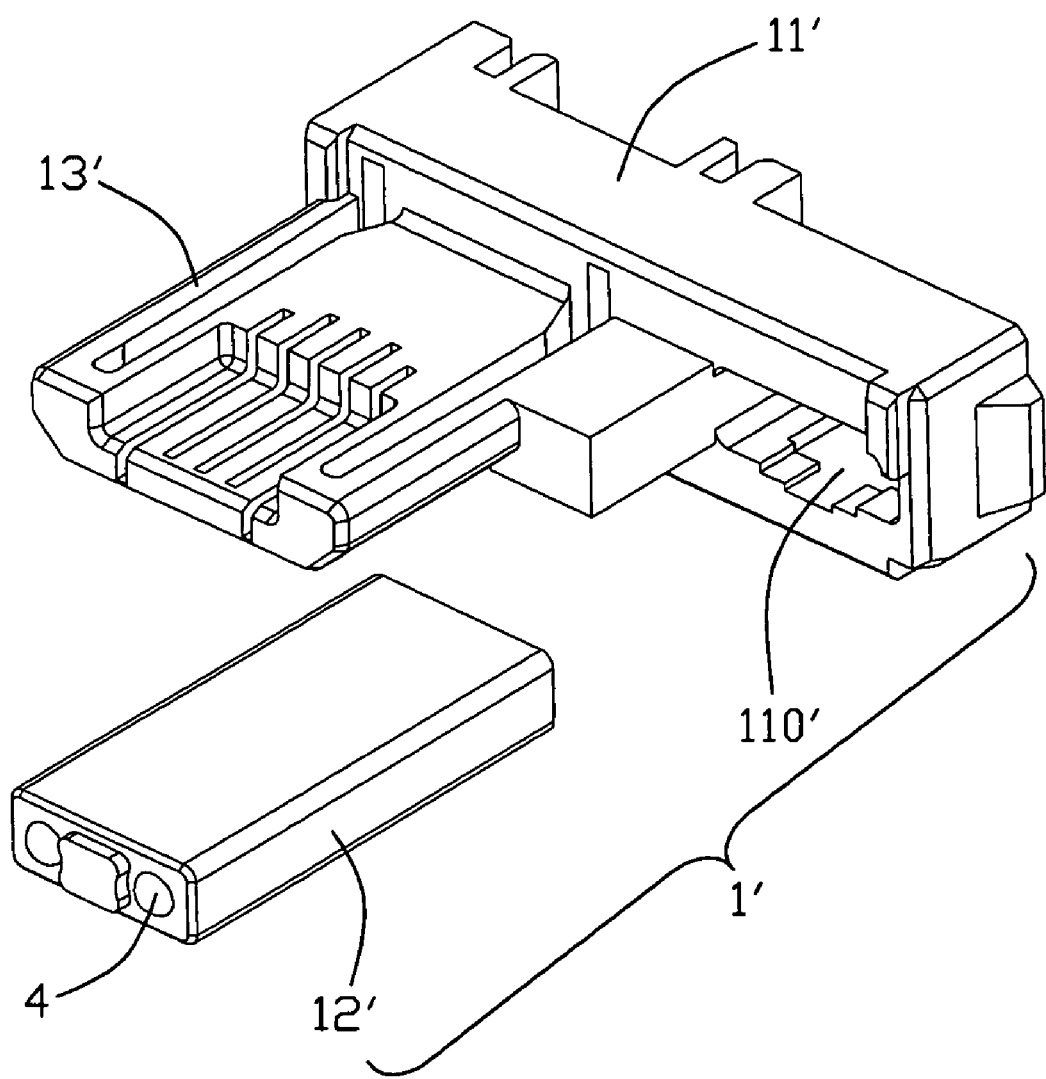
FIG. 11 is an exploded, perspective view of insulative housing of FIG. 10.

Referring to FIGS. 10-11, and in conjunction with FIGS. 1-9, another plug connector according to a second embodiment of the present is disclosed. Compared with the plug connector 100 of the first embodiment, an insulative housing 1' of the second embodiment is different from the insulative housing 1. The insulative housing 1' includes a base portion 11', a first tongue portion 12' and a second tongue portion 13' arranged in juxtaposed manner and extending forwardly from the base portion 11'. A gap 120' is located between the first tongue portion 12' and the second tongue portion 13'. The second tongue portion 13' is similar to the second tongue portion 13 of the plug connector 100, excepted that the second tongue portion 13' is integrated with the base portion 11', and there are no lens members arranged at lateral sides thereof. The first tongue portion 11' is rectangular shaped, and two lens members 4' is disposed in lateral sides thereof, and the first tongue portion 11' is mounted to a cavity 110' defined in the base portion 11'. Other similar parts and description of the another plug connector of the second embodiment are omitted hereby.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

I claim:

1. A connector, comprising:
   a metallic shell having a mating frame part, said mating frame part including a number of sides together enclosing a hollow portion, and the hollow portion divided into two ports with different shapes;
   an insulative housing having a base portion and two juxtaposed tongue portions extending forwardly from the base portion, with a plurality of contacts mounted to the tongue portions, two lens members received in lateral sides of one of the tongue portions; and
   the two tongue portions respectively received in the two ports.

2. The connector as claimed in claim 1, wherein the contacts located on the two tongue portions have substantially identical structure and arrangement.

3. The connector as claimed in claim 1, wherein the number of contacts on the two tongue portions is equal.

4. The connector as claimed in claim 1, wherein the one tongue portion is different from the other tongue portion in shape.

5. The connector as claimed in claim 4, wherein the one tongue portion is of L-shaped viewed from both a lateral side and a top side.

6. The connector as claimed in claim 5, wherein the contacts mounted to the one tongue portion includes two differential pairs consisted of four signal contacts and a grounding contacts disposed between the two differential pairs.

7. The connector as claimed in claim 4, wherein a depression portion is defined in the other tongue portion, and contacting portions of the contacts extend into the depression portion.

8. The connector as claimed in claim 7, wherein the two lens members are respectively mounted to the lateral sides of the other tongue portion.

9. A connector, comprising:
   an insulative housing having a base portion and two different tongue portions combined with the base portion, with one of the tongue portions detachable relative to the base portion;
   two lens members received in lateral sides of the one tongue portion;
   a plurality of contacts at least mounted to the other tongue portions;
   a metallic shell having a mating frame part enclosing the two tongue portions therein;
   wherein a ridge portion is formed on a bottom side of the mating frame part and extends into a gap between the two tongue portions.

10. The connector as claimed in claim 9, wherein the contacts includes two power contacts and three signal contacts disposed between the two power contacts, and the power contacts are longer than the signal contacts.

11. The connector as claimed in claim 9, wherein the one tongue portion is mounted to a cavity defined in the base portion.

12. The connector as claimed in claim 11, wherein the other tongue portion is unitarily integrated with the tongue portion.

13. The connector as claimed in claim 12, wherein the two tongue portion are arranged in juxtaposed manner.

14. The connector as claimed in claim 9, wherein two attachment beams are respectively formed at lateral sides of the one tongue portion.

15. The connector as claimed in claim 14, wherein two grooves are defined in the two attachment beams.

16. The connector as claimed in claim 15, wherein two latch members are mounted to the two grooves, respectively.

17. The connector as claimed in claim 14, wherein the two lens members are enclosed in the two attachment beams, respectively.

18. A cable connector assembly comprising:

an insulative housing defining a base;

a first mating tongue unitarily extending forwardly from the base;

a second mating tongue discrete from the base while being assembled to the base and extending forwardly from the base with a side-by-side relation with the first mating tongue; and a plurality of first contacts and second contacts respectively disposed on the first mating tongue and said second mating tongue;

wherein said second mating tongue defines a pair of receiving cavities by two lateral sides to respectively receive a pair of optical elements therein under condition of said optical elements communicate with exterior in a front-to-back direction while said first contacts and said second contacts communicate with exterior in a vertical direction perpendicular to said first mating tongue and said second mating tongue.

19. The cable connector assembly as claimed in claim 18, further including a pair of deflectable latches wherein one of which is located at a lateral side of the housing and the other is located in a middle portion thereof.

* * * * *